E. ROBINSON.
DEEP TILLING ATTACHMENT.
APPLICATION FILED MAR. 25, 1914.
1,100,620.
Patented June 16, 1914.
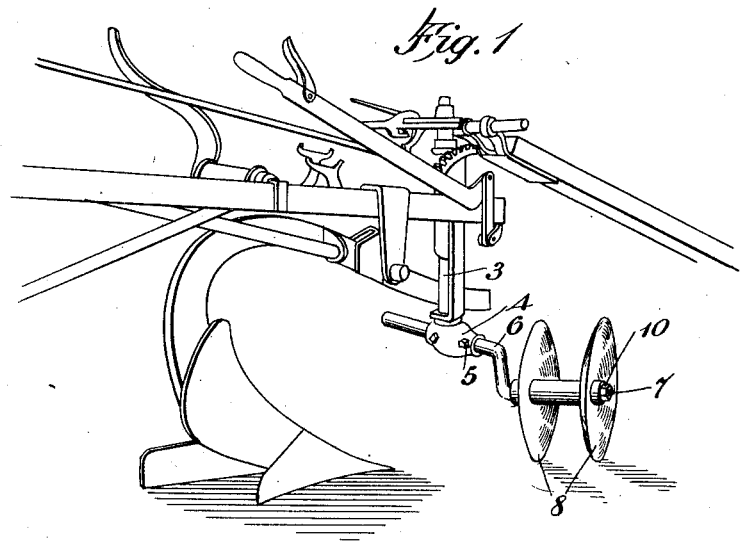
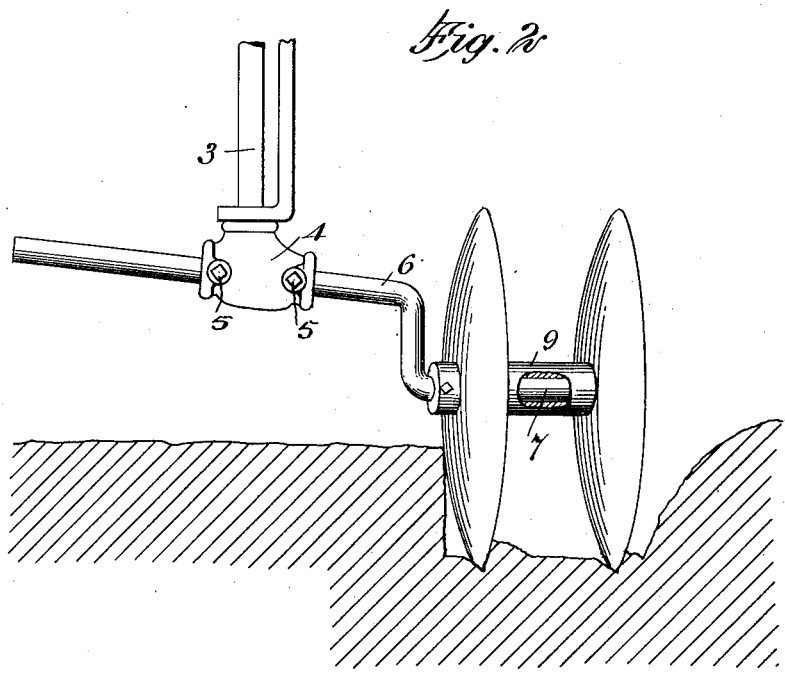
WITNESSES
INVENTOR
Ellsworth Robinson
BY
ATTORNEYS
COLUMBIA PLANOGRAPH CO., WASHINGTON, D. C.

UNITED STATES PATENT OFFICE.

ELLSWORTH ROBINSON, OF SELBY, SOUTH DAKOTA.

DEEP-TILLING ATTACHMENT.

1,100,620.   Specification of Letters Patent.   Patented June 16, 1914.

Application filed March 25, 1914. Serial No. 827,131.

*To all whom it may concern:*

Be it known that I, ELLSWORTH ROBINSON, a citizen of the United States, and a resident of Selby, in the county of Walworth and State of South Dakota, have invented a new and Improved Deep-Tilling Attachment, of which the following is a full, clear, and exact description.

My invention relates to deep tilling attachments for plows.

The object thereof is to provide a simple, strong and inexpensive structure which can be easily and quickly attached or detached from a plow, and which attachment takes the place of the front furrow wheel and, similarly, forms a support for the frame of the plow, also a guide for the plow. I am aware that there are a number of attachments to be used in connection with plows for similar purposes, but all of them are provided with an independent frame, detachably secured to the plow and have adjustable means independent of the means existing on the plow.

The invention consists of the construction and combination of parts to be more fully described hereinafter and fully set forth in the claims.

Reference is to be had to the accompanying drawings forming a part of the specification, in which like characters indicate corresponding parts in both views and in which—

Figure 1 is a perspective view of a sulky plow provided with an embodiment of my invention; and Fig. 2 is a face elevation of the deep tilling attachment, partly in section, showing the details of construction.

Referring to the drawings, the adjustable post 3 of the plow, which carries the front furrow wheel, has at its lower end a socket 4 provided with set screws 5 whereby the axle of the front furrow wheel is normally clamped in the socket 4. My deep tilling attachment is adapted to be secured to said socket 4, and consists of a crank 6 clamped in the socket 4, the projecting end 7 of which is slightly deflected from the plane of the crank, so that the disks 8 rotatably mounted on said end 7 of the crank are at a proper angle to till the soil while the plow is moved, and also to properly guide the plow by the engagement of the disks with the furrow. The disks 8, which are two in number, are rigidly connected by a sleeve 9, which sleeve forms a large bearing for said disk on the end 7 of the crank. Said sleeve 9 forming the bearing is of the dust-proof type, and its displacement from the end 7 of the crank is prevented by a member 10 carried by the end 7.

It will be remarked that my deep tilling device carried by the socket 4 provided on the adjustable post 3, permits the adjustment of the plow, and, therefore, the depth of the furrow formed thereby. Furthermore, the rear disk 8 constitutes a guide for the plow, so that my device, in addition to causing deep tilling, incorporates all the advantages of an ordinary front furrow wheel. By means of the set screws 5, the disks 8 can be clamped at variable distances from the socket. Furthermore, the position of the end 7 relative to the socket can be varied by turning the end of the crank engaged in the socket 4 before the same is clamped. It is self-evident from the drawings that the substitution of my device for the front furrow wheel can be easily and quickly made, as all that is necessary is to release the grip of the screws 5 on the crank 6, pull the same out of the socket and insert the axle which carries the front furrow wheel, and by tightening the set screws 5 the device is properly clamped in position.

Having thus described my invention, I claim as new and desire to secure by Letters Patent:

1. The combination with a plow having an adjustable post for a front furrow wheel of a deep tilling device removably associated with said post.

2. In a plow, an adjustable post for a front furrow wheel; a crank carried by said post; and disks rotatably mounted on said crank.

3. In a sulky plow, an adjustable post for the front furrow wheel, said post having a socket at the lower end thereof; a crank in said socket, said socket having means for adjustably securing said crank; and a pair of disks rotatably mounted on said crank.

4. In combination with a sulky plow, a deep tilling device adapted to take the place of the front furrow wheel, said deep tilling device comprising a crank and a pair of disks mounted to rotate on said crank.

In testimony whereof I have signed my name to this specification in the presence of two subscribing witnesses.

ELLSWORTH ROBINSON.

Witnesses:
 FRED GRIFFIN,
 CHAS. D. DURFEY.

Copies of this patent may be obtained for five cents each, by addressing the "Commissioner of Patents, Washington, D. C."